US010592191B2

(12) United States Patent
Kato et al.

(10) Patent No.: US 10,592,191 B2
(45) Date of Patent: *Mar. 17, 2020

(54) APPARATUS, SYSTEM, AND METHOD OF CONTROLLING DISPLAY OF IMAGE DATA IN A NETWORK OF MULTIPLE DISPLAY TERMINALS

(71) Applicant: Ricoh Company, Ltd., Tokyo (JP)

(72) Inventors: Yoshinaga Kato, Kanagawa (JP); Tomoki Kanda, Kanagawa (JP); Shuhei Tsubone, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/210,769

(22) Filed: Dec. 5, 2018

(65) Prior Publication Data

US 2019/0107988 A1 Apr. 11, 2019

Related U.S. Application Data

(63) Continuation of application No. 15/270,235, filed on Sep. 20, 2016, now Pat. No. 10,185,531.

(30) Foreign Application Priority Data

Sep. 29, 2015 (JP) .................................. 2015-191005

(51) Int. Cl.
*G06F 3/14* (2006.01)
*H04L 12/18* (2006.01)
(Continued)

(52) U.S. Cl.
CPC .......... *G06F 3/1423* (2013.01); *G06F 3/1454* (2013.01); *H04L 12/1813* (2013.01);
(Continued)

(58) Field of Classification Search
CPC ................................ G06F 3/1454; H04N 7/15
See application file for complete search history.

(56) References Cited

U.S. PATENT DOCUMENTS 8,638,345 B2 1/2014 Miyazawa
8,731,331 B2 5/2014 Tanaka
(Continued)

FOREIGN PATENT DOCUMENTS

JP 2012-108479 6/2012
JP 2012-231428 A 11/2012
(Continued)

OTHER PUBLICATIONS

U.S. Appl. No. 15/179,303, filed Jun. 10, 2016.
(Continued)

*Primary Examiner* — Gene W Lee
(74) *Attorney, Agent, or Firm* — Oblon, McClelland, Maier & Neustadt, L.L.P.

(57) ABSTRACT

A display control apparatus capable of controlling display of images on a first display, obtains display area information indicating a size of a display area of the first display for displaying a second image generated at an external apparatus, transmits to the external apparatus resolution information indicating a resolution of image data that matches the size of the display area of the first display, receives from the external apparatus second image data having the resolution that matches the size of the display area of the first display, the second image data being generated at the external apparatus based on the second image, and controls the first display to display the second image in the display area based on the second image data received from the external apparatus.

12 Claims, 13 Drawing Sheets

(51) Int. Cl.
*H04M 3/56* (2006.01)
*H04N 7/14* (2006.01)
*H04N 7/15* (2006.01)

(52) U.S. Cl.
CPC ........ *H04L 12/1827* (2013.01); *H04M 3/567* (2013.01); *H04N 7/147* (2013.01); *H04N 7/15* (2013.01)

(56) References Cited

U.S. PATENT DOCUMENTS

| | | | |
|---|---|---|---|
| 9,319,628 | B2 | 4/2016 | Kato |
| 2005/0053287 | A1* | 3/2005 | So .......................... H04N 19/50 382/232 |
| 2006/0181750 | A1 | 8/2006 | Lu et al. |
| 2007/0058210 | A1 | 3/2007 | Sakuramata et al. |
| 2007/0058226 | A1 | 3/2007 | Lu et al. |
| 2007/0070472 | A1 | 3/2007 | Kato et al. |
| 2007/0070473 | A1 | 3/2007 | Lu et al. |
| 2007/0091394 | A1 | 4/2007 | Sakayori et al. |
| 2007/0115491 | A1 | 5/2007 | Kato et al. |
| 2007/0133015 | A1 | 6/2007 | Saeki et al. |
| 2007/0133073 | A1 | 6/2007 | Shida et al. |
| 2007/0139707 | A1 | 6/2007 | Takami et al. |
| 2007/0157084 | A1 | 7/2007 | Yano et al. |
| 2010/0046044 | A1 | 2/2010 | Ishizu et al. |
| 2010/0066749 | A1 | 3/2010 | Mihara et al. |
| 2010/0067049 | A1 | 3/2010 | Kawada et al. |
| 2010/0110294 | A1 | 5/2010 | Oka |
| 2012/0026529 | A1 | 2/2012 | Sakuramata et al. |
| 2012/0140021 | A1 | 6/2012 | Tanaka et al. |
| 2012/0140022 | A1 | 6/2012 | Kato et al. |
| 2012/0274728 | A1 | 11/2012 | Yasoshima |
| 2013/0060926 | A1 | 3/2013 | Kato et al. |
| 2013/0242030 | A1 | 9/2013 | Kato et al. |
| 2013/0242033 | A1 | 9/2013 | Kato et al. |
| 2013/0242034 | A1 | 9/2013 | Kato et al. |
| 2013/0271557 | A1 | 10/2013 | Kato et al. |
| 2014/0015917 | A1 | 1/2014 | Kato |
| 2014/0043431 | A1 | 2/2014 | Kato |
| 2014/0074932 | A1 | 3/2014 | Mihara et al. |
| 2014/0077937 | A1 | 3/2014 | Kato et al. |
| 2014/0104373 | A1 | 4/2014 | Kato et al. |
| 2014/0118470 | A1 | 5/2014 | Kato et al. |
| 2014/0118476 | A1 | 5/2014 | Nagase et al. |
| 2014/0253676 | A1 | 9/2014 | Nagase et al. |
| 2014/0266978 | A1 | 9/2014 | Ishigami et al. |
| 2014/0267565 | A1 | 9/2014 | Nakafuji et al. |
| 2014/0292816 | A1 | 10/2014 | Shigemasa et al. |
| 2014/0293000 | A1 | 10/2014 | Ujiie et al. |
| 2014/0313283 | A1 | 10/2014 | Kato |
| 2014/0365628 | A1 | 12/2014 | Tamura et al. |
| 2014/0368410 | A1 | 12/2014 | Imai et al. |
| 2015/0049237 | A1 | 2/2015 | Ujiie et al. |
| 2015/0058735 | A1 | 2/2015 | Nagase et al. |
| 2015/0077511 | A1 | 3/2015 | Mihara et al. |
| 2015/0109344 | A1 | 4/2015 | Tomono |
| 2015/0199946 | A1 | 7/2015 | Kato |
| 2015/0222855 | A1 | 8/2015 | Kato |
| 2015/0229681 | A1 | 8/2015 | Tsubone et al. |
| 2015/0296176 | A1 | 10/2015 | Kato |
| 2015/0362852 | A1 | 12/2015 | Moriya et al. |
| 2015/0382059 | A1 | 12/2015 | Mano |
| 2016/0077783 | A1 | 3/2016 | Kato |
| 2016/0105490 | A1 | 4/2016 | Kato et al. |
| 2016/0105642 | A1 | 4/2016 | Nagase et al. |
| 2016/0149960 | A1 | 5/2016 | Kato |
| 2016/0165180 | A1 | 6/2016 | Kato et al. |
| 2017/0053427 | A1 | 2/2017 | Oikawa |

FOREIGN PATENT DOCUMENTS

| | | |
|---|---|---|
| JP | 2014-003448 | 1/2014 |
| JP | 2014-200061 | 10/2014 |
| JP | 2015-84511 A | 4/2015 |

OTHER PUBLICATIONS

U.S. Appl. No. 15/151,991, filed May 11, 2016.
U.S. Appl. No. 15/159,096, filed Dec. 22, 2014.
U.S. Appl. No. 15/074,241, filed Mar. 18, 2016.
U.S. Appl. No. 15/082,364, filed Mar. 28, 2016.
U.S. Appl. No. 15/084,534, filed Mar. 30, 2016.
U.S. Appl. No. 15/086,792, filed Mar. 31, 2016.
Extended European Search Report dated Feb. 20, 2017 in Patent Application No. 16188399.6.
Office Action dated Jun. 25, 2019 in Japanese Patent Application No. 2015-191005.

* cited by examiner

FIG. 7A
LAYOUT MANAGEMENT TABLE
| IMAGE DATA TYPE | PRIORITY | POSITION INFORMATION (left, top) | SIZE (Horizontal, Vertical) |
|---|---|---|---|
| DISPLAY IMAGE | 1 | (0, 0) | (640, 480) |
| CAPTURED IMAGE | 2 | (0, 0) | (1920, 1080) |
| ... | ... | ... | ... |
| | | | |
FIG. 7B
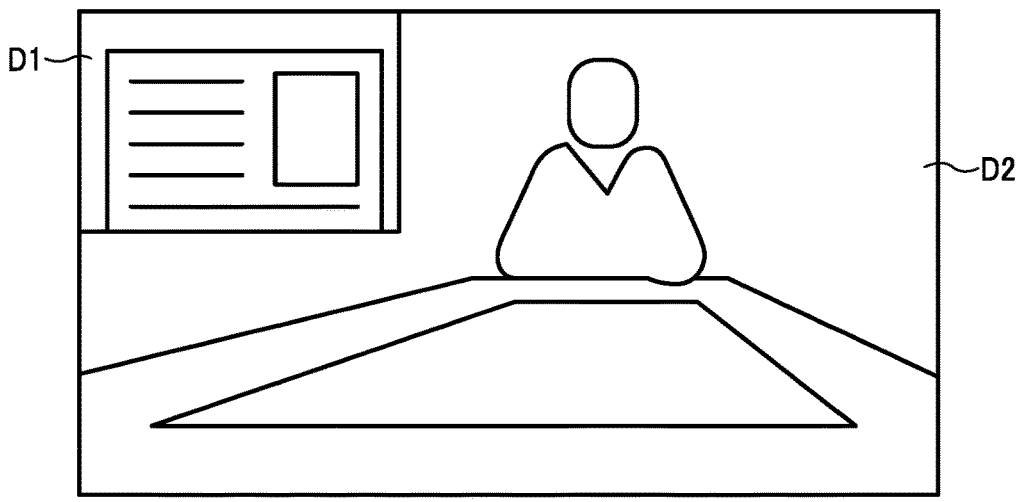
FIG. 7C
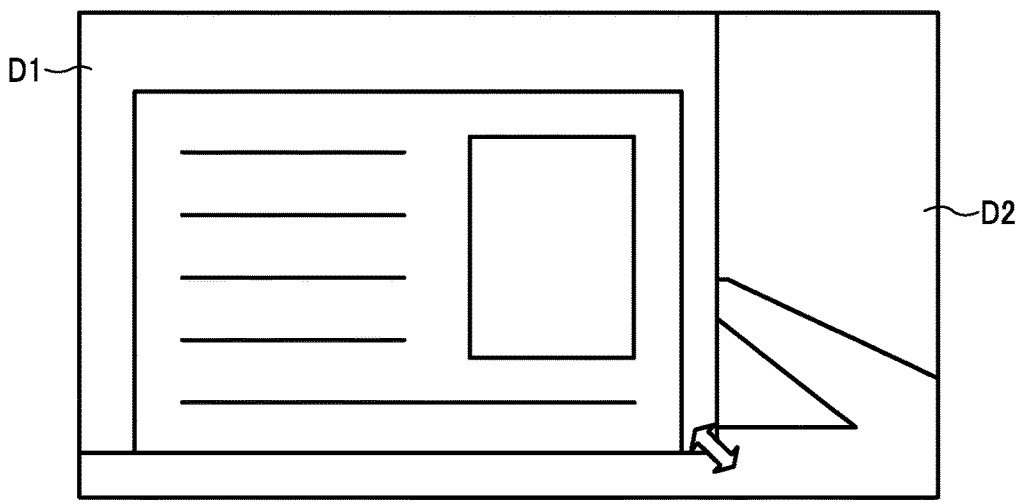

FIG. 8

AUTHENTICATION
MANAGEMENT TABLE

| TERMINAL ID | PASSWORD |
|---|---|
| 01aa | aaaa |
| 01ab | abab |
| 01ac | acac |
| ... | ... |
| 01da | dada |
| 01db | dbdb |
| 01dc | dcdc |
| ... | ... |

APPARATUS, SYSTEM, AND METHOD OF CONTROLLING DISPLAY OF IMAGE DATA IN A NETWORK OF MULTIPLE DISPLAY TERMINALS

CROSS-REFERENCE TO RELATED APPLICATIONS

This application is a continuation Application of U.S. application Ser. No. 15/270,235, filed Sep. 20, 2016, which is based on and claims priority pursuant to 35 U.S.C. § 119(a) to Japanese Patent Application No. 2015-191005, filed on Sep. 29, 2015, in the Japan Patent Office. The entire contents of the above-identified applications are incorporated herein by reference.

BACKGROUND

Technical Field

The present invention relates to an apparatus, system, and method of controlling display of image data, and a recording medium.

Discussion of the Background Art

With the need for reducing costs or times associated with business trips, communication systems are widely used, which are capable of carrying out videoconferences among remotely located sites through a communication network such as the Internet. In such communication systems, image data and audio data are transmitted or received among a plurality of communication terminals. As image data for transmission, in addition to image data of a captured image that is captured at the communication terminal, image data of an input image that is input from an external apparatus to the communication terminal may be transmitted to the counterpart communication terminal.

When displaying the input image input from the external apparatus on a display provided for the communication terminal, the input image may not be appropriately displayed at a right place with a right size.

SUMMARY

Example embodiments of the present invention include a display control apparatus, which controls display of images on a first display provided for the display control apparatus, the images including a first image generated at the display control apparatus and a second image generated at an external apparatus. The display control apparatus obtains display area information indicating a size of a display area of the first display for displaying the second image, transmits to the external apparatus resolution information indicating a resolution of image data that matches the size of the display area of the first display, and receives from the external apparatus second image data having the resolution that matches the size of the display area of the first display, the second image data being generated at the external apparatus based on the second image. The display control apparatus controls the first display to display the second image in the display area based on the second image data received from the external apparatus.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 7A is an illustration of an example data structure of a layout management table; FIG. 7B is an illustration of an example screen displaying an image; FIG. 7C is an illustration of an example screen displaying an image, when receiving a request for changing a size of a display area for displaying an image;

FIG. 8 is an illustration of an example data structure of an authentication management table;

Figure 1:
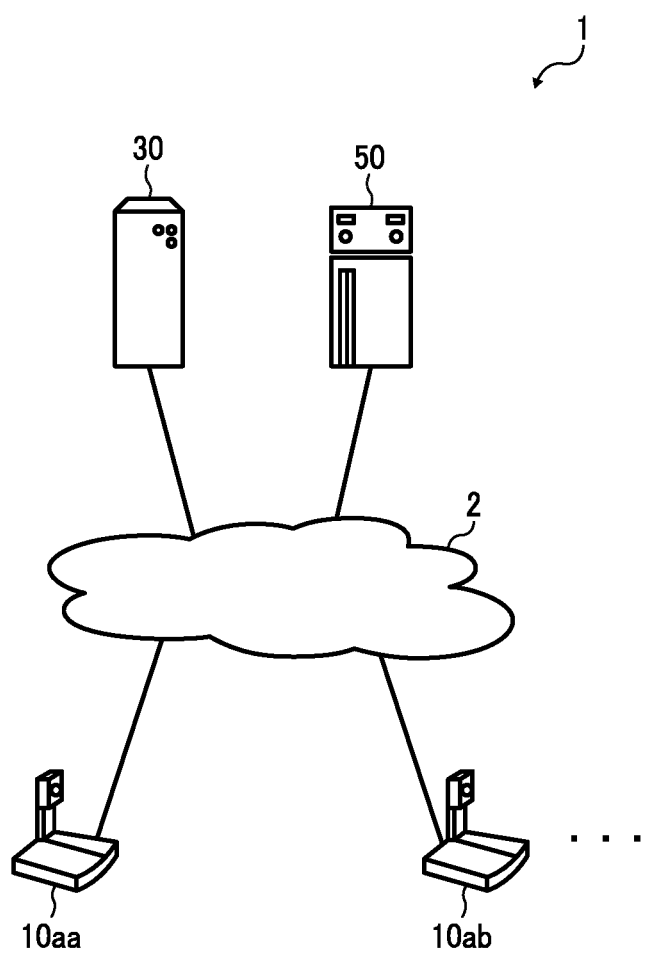
FIG. 1 is a schematic diagram illustrating a communication system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present invention are described.

FIG. 1 is an overall configuration diagram of a communication system 1 according to an embodiment of the present invention. As illustrated in FIG. 1, the communication system 1 includes a plurality of communication terminals (10aa, 10ab, . . . ), a relay device 30, and a communication management system 50. The communication system 1 controls communication of content data, such as image data and audio data, to carry out videoconference among a plurality of remotely located sites. Examples of image data include, but not limited to, data of a captured image captured at the communication terminal (10aa, 10ab, . . . ), and data of input image input to the communication terminal (10aa, 10ab, . . . ).

The communication terminals (10aa, 10ab, . . . ), the relay device 30, and the communication management system 50 are connected to one another through a communication network 2 to be communicable with one another.

In the following, a "communication terminal" may simply be referred to as a "terminal", and a "communication management system" may simply be referred to as a "management system". In this disclosure, an arbitrary one or ones of the plurality of terminals (10aa, 10ab, . . . ) is/are represented as a "terminal(s) 10".

In this example, the communication network 2 is implemented mainly by the Internet. The communication network 2 may not only include a wired network, but also a wireless network such as a network in compliance with WiFi (Wireless Fidelity) or Bluetooth.

Note that the communication terminal may be used not only for communication between different offices or for communication between different rooms in the same office, but also for communication within the same room or for outdoor-indoor communication or outdoor-outdoor communication. In the case where the terminal 10 is used outside, wireless communication using a mobile phone communication network or the like is performed.

The terminal 10 illustrated in FIG. 1 may be implemented by a videoconference terminal capable of carrying out communication by a user through transmission or reception of content data. More specifically, the terminal 10 transmits or receives content data using a predetermined communications protocol. The communications protocol used by the terminal 10 is mainly defined by a call control protocol used for connecting or disconnecting connections with the counterpart terminal, and an encoding format used for encoding the contents data to an IP packet.

Examples of the call control protocol being used by the terminal 10 include, but not limited to, (1) session initial protocol (SIP), (2) H.323, (3) the extended SIP, (4) Instant Messenger (IM) Protocol such as extensible messaging and presence protocol (XMPP), ICQ (Registered Trademark), AIM (Registered Trademark), or Skype (Registered Trademark), (5) protocol using the SIP message method, (6) Internet relay chat (IRC) protocol, and (7) extended IM based protocol such as Jingle.

The relay device 30, which may be implemented by one or more computers, relays content data among the plurality of terminals 10. The management system 50, which may be implemented by one or more computers, centrally manages login authentication of the terminal 10, a communication state of the terminal 10, a contact list, and a communication state of the relay device 30. The image data may be a video image or a still image, or both of the video image and the still image.

Figure 2:
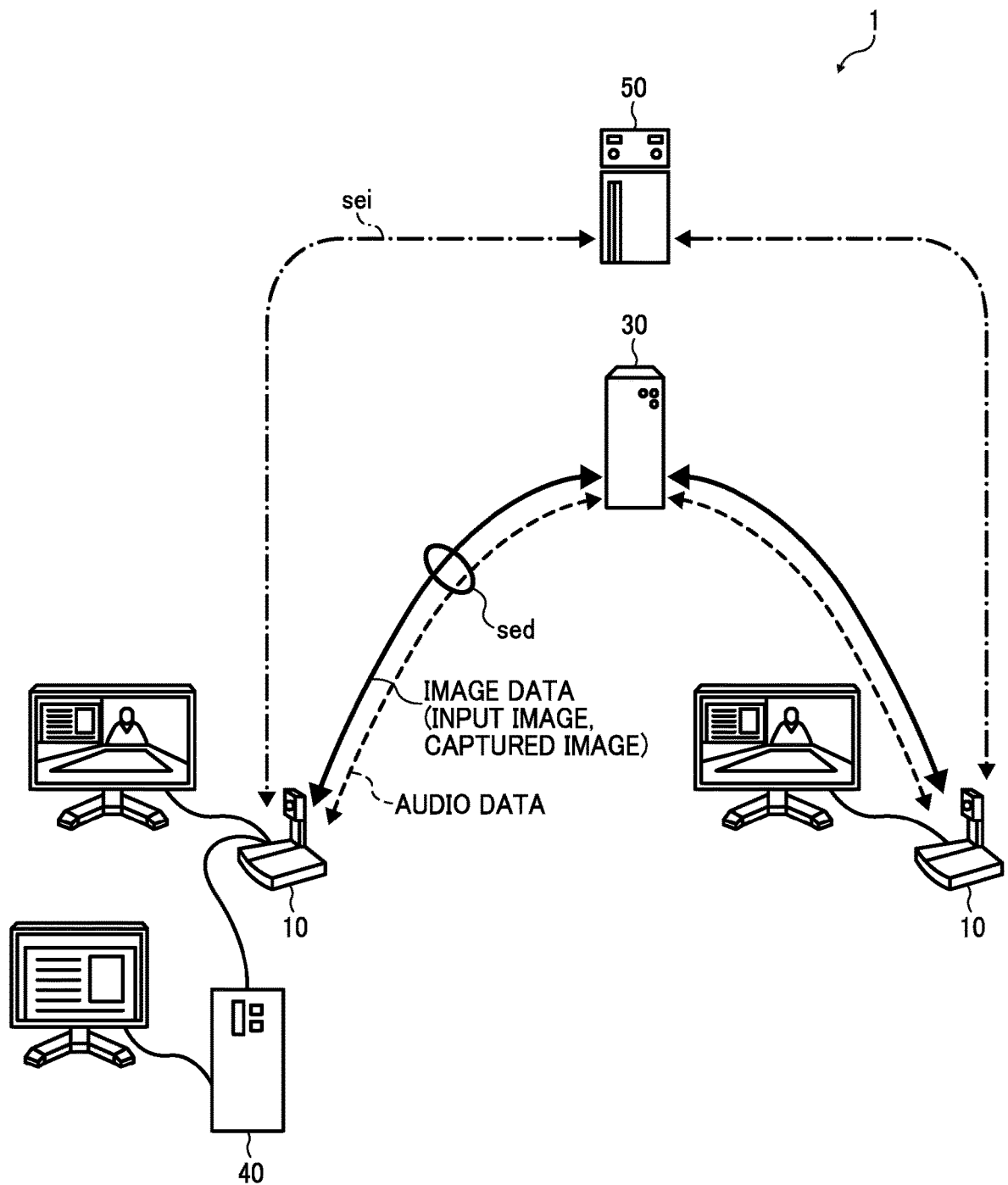
FIG. 2 is an illustration for explaining a communication state among a plurality of communication terminals in the communication system of FIG. 1.

FIG. 2 illustrates an example case in which a plurality of terminals communicate with one another. In the communication system 1 referring to FIG. 2, the management system 50 establishes a management data communication session "sei" with each one of the terminals 10, to transmit or receive various management data between the terminals 10.

The terminal 10 establishes a content data communication session "sed" with the relay device 30, to transmit or receive image data and audio data, in the H.264/SVC standard.

One of the terminals 10 illustrated in FIG. 2 is connected to an input apparatus 40 through, for example, a network. The input apparatus 40 is provided separately from the terminal 10 and inputs image data to the connected terminal 10. The terminal 10, which receives the input image data, transmits the input image data with the captured image data that is captured at the terminal 10, to the counterpart terminal 10.

<Hardware Configuration of Communication System>

Figure 3:
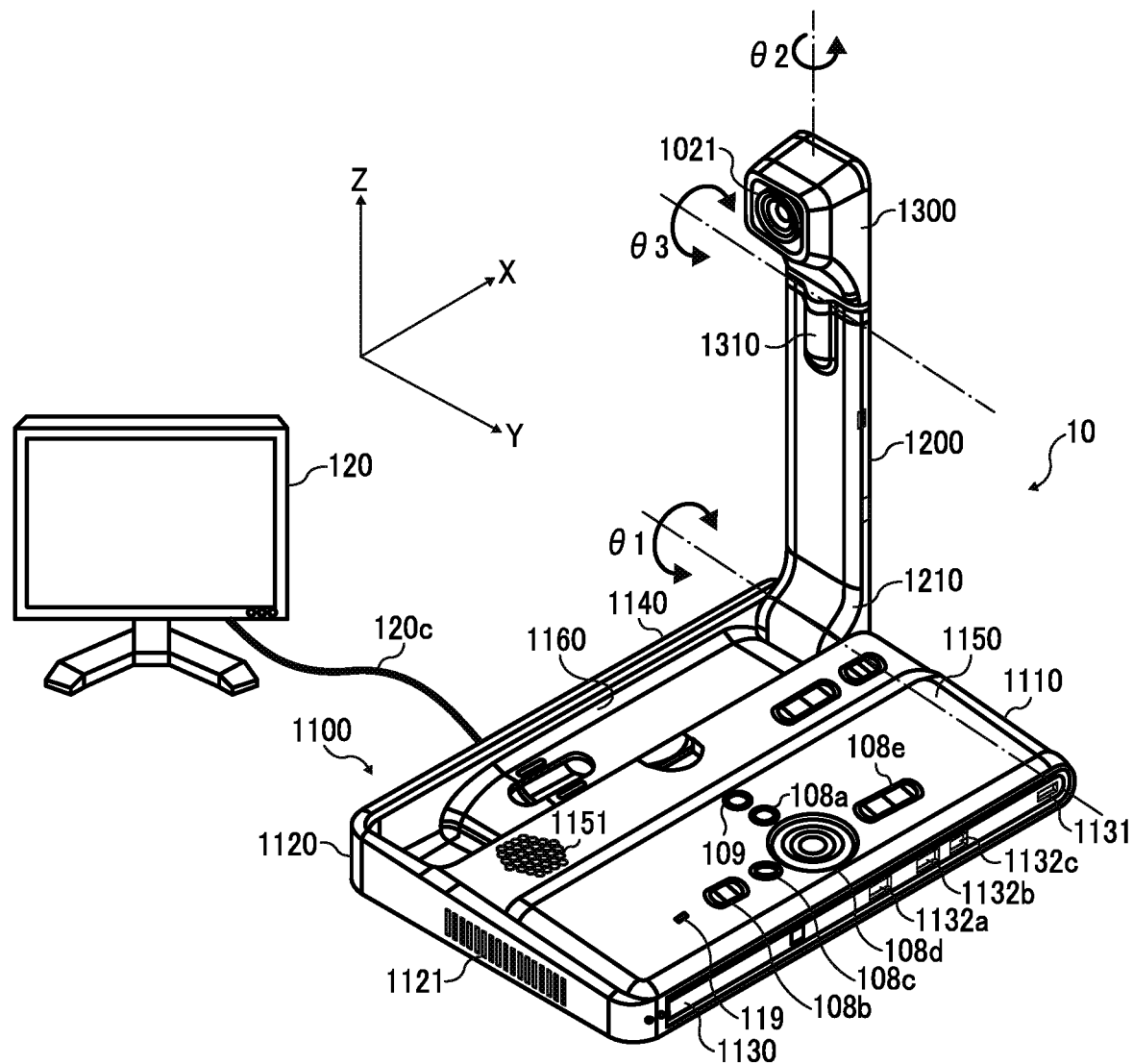
FIG. 3 is an external view illustrating a communication terminal of the communication system of FIG. 1.

Now, a hardware configuration of the communication system 1 is described. FIG. 3 is a perspective view illustrating an external appearance of the terminal 10 according to the embodiment. As illustrated in FIG. 3, the terminal 10 includes a casing 1100, an arm 120, and a camera housing 1300. The casing 1100 includes a front side wall 1100 having a plurality of air intake holes formed over the nearly entire surface of the intake surface, and a back side wall 1120 having a plurality of exhaust holes over the nearly entire surface of the exhaust surface 1121. As a cooling fan included in the casing 1100 is driven, air behind the communication terminal 10 can be taken in via the inlet face and exhausted to the rear of the communication terminal 10 via the exhaust face 1121. A right-side wall 1130 of the casing 1100 has a sound pickup hole 1131 formed thereon, and a built-in microphone 114, described later, is capable of picking up sound such as sound, noise, or vibration.

The casing 1100 has an operation panel 1150, which is provided at a front surface toward the right side wall 1130. The operation panel 1150 includes a plurality of operation keys 108a to 108e, a power switch 109, and a plurality of sound output holes 1151. Through the sound output holes 1151, a speaker 115 of the terminal 10 is able to output sounds such as sounds generated based on human voice. The casing 1100 further includes a holder 1160, which is provided at the front surface toward the left side wall 1140. The holder 1160, which has a concave shape, accommodates therein the arm 1200 and the camera housing 1300. The right side wall 1130 is further provided with a plurality of connection ports 1132a to 1132c ("connection ports 1132"). The connection ports 1132 allow electrical connection to an external device through an external device connection I/F 118. The casing 1100 further includes a left side wall 1140, which is provided with a connection port to connect the external display 120 to the display I/F 117 through a cable 120c.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

The arm 1200 is attached to the casing 1100 via a torque hinge 1210 so as to be rotatable in the vertical direction within the range of a tilt angle θ1 of 135 degrees with respect to the casing 1100. FIG. 3 illustrates the case where the tilt angle θ1 is 90 degrees. The camera housing 1300 has a built-in camera 112 provided thereon, which will be described later, and the camera 112 can capture an image of a user, a document, a room, or the like. The camera housing 1300 is formed with a torque hinge 1310. The camera housing 1300 is attached to the arm 1200 through the torque hinge 1310. The camera housing 1300 is attached to the arm 1200 via the torque hinge 1310 so as to be rotatable in the vertical and horizontal directions within the range of a pan angle θ2 of ±180 degrees and a tilt angle θ3 of ±45 degrees with respect to the arm 1200, in which the state illustrated in FIG. 3 serves as 0 degrees.

Since the relay device 30, the input apparatus 40, and the management system 50 each have the same appearance as that of a general computer, a description of the appearance thereof is omitted.

Figure 4:
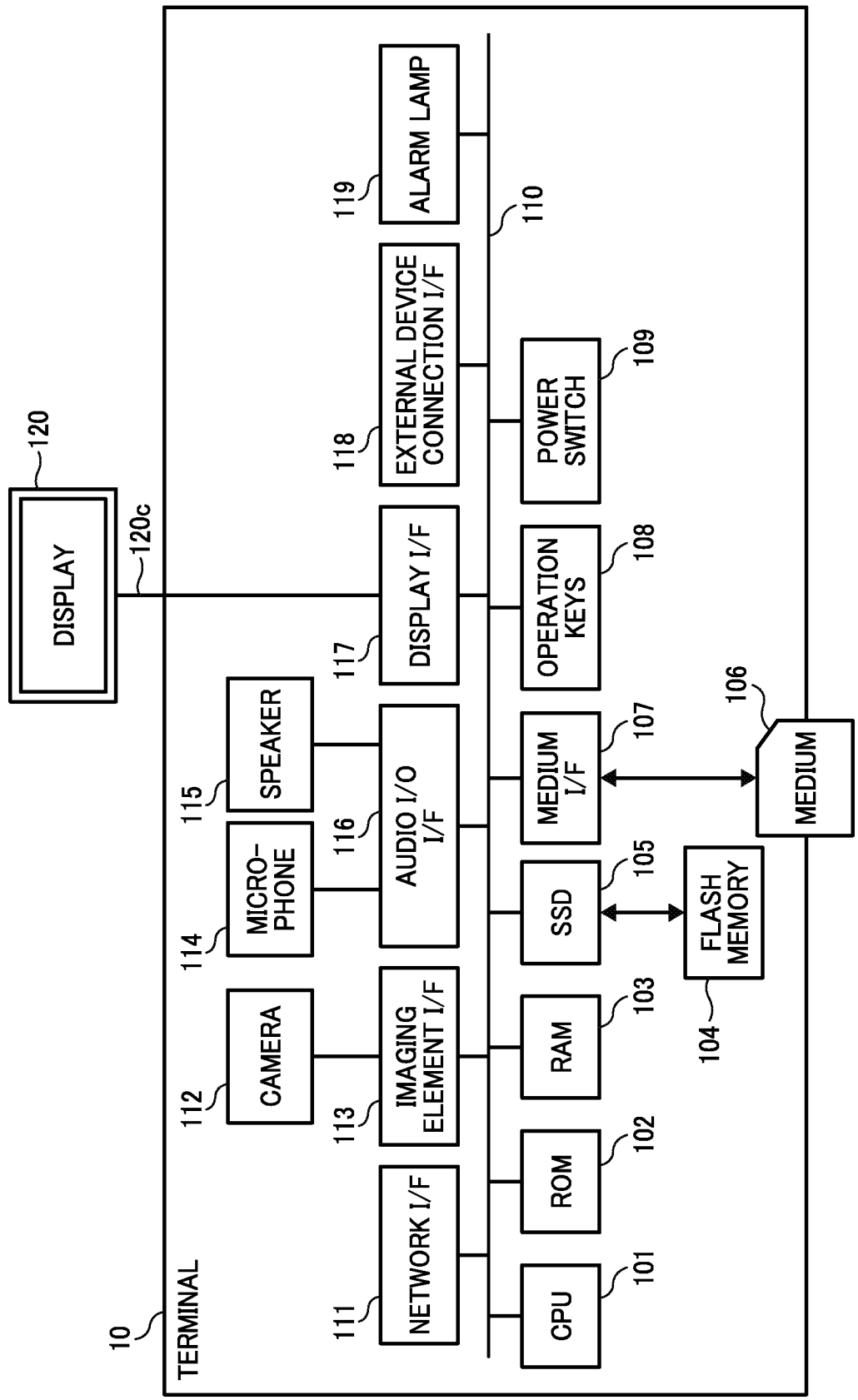
FIG. 4 is a schematic block diagram illustrating a hardware configuration of the communication terminal of FIG. 3.

FIG. 4 is a schematic block diagram illustrating a hardware configuration of the communication terminal 10. As illustrated in FIG. 4, the communication terminal 10 of the embodiment includes a central processing unit (CPU) 101 that controls entire operation of the communication terminal 10, a read only memory (ROM) 102 that stores a program for operating the CPU 101 such as an initial program loader (IPL), a random access memory (RAM) 103 that operates as a work area for the CPU 101, a flash memory 104 that stores various types of data, such as the terminal control program, image data, and audio data, a solid state drive (SSD) 105 that controls reading/writing of various types of data from/to the flash memory 104 under control of the CPU 101, a medium I/F 107 that controls reading/writing (storage) of data from/to a recording medium 106, the operation key 108 operated in the case of, for example, selecting a counterpart terminal of the communication terminal 10, the power switch 109 for turning on/off the power of the communication terminal 10, and a network interface (I/F) 111 for transmitting data using the communication network 2.

The terminal 10 further includes the built-in camera 112 that captures an image of a subject and obtains image data under control of the CPU 101, an imaging element I/F 113 that controls driving of the camera 112, the built-in microphone 114 that receives an audio input, the built-in speaker 115 that outputs sounds, an audio input/output I/F 116 that processes inputting/outputting of an audio signal between the microphone 114 and the speaker 115 under control of the CPU 101, a display I/F 117 that transmits image data to an external display 120 under control of the CPU 101, the external device connection I/F 118 for connecting various external devices, an alarm lamp 119 for notifying of an error in functionality of the terminal 10, and a bus line 110 such as an address bus and a data bus for electrically connecting the above-described elements as illustrated in FIG. 4.

The display 120 is a display formed of liquid crystal or organic electroluminescence (EL) that displays an image of a subject, an operation icon, or the like. The display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data through photoelectric conversion. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable that is inserted into the connection port 1132 or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the communication terminal 10. The recording medium 106 can be any non-volatile memory that reads or writes data under control of the CPU 101, such that any memory such as an electrically erasable and programmable read-only memory (EEPROM) may be used instead of the flash memory 104.

Figure 5:
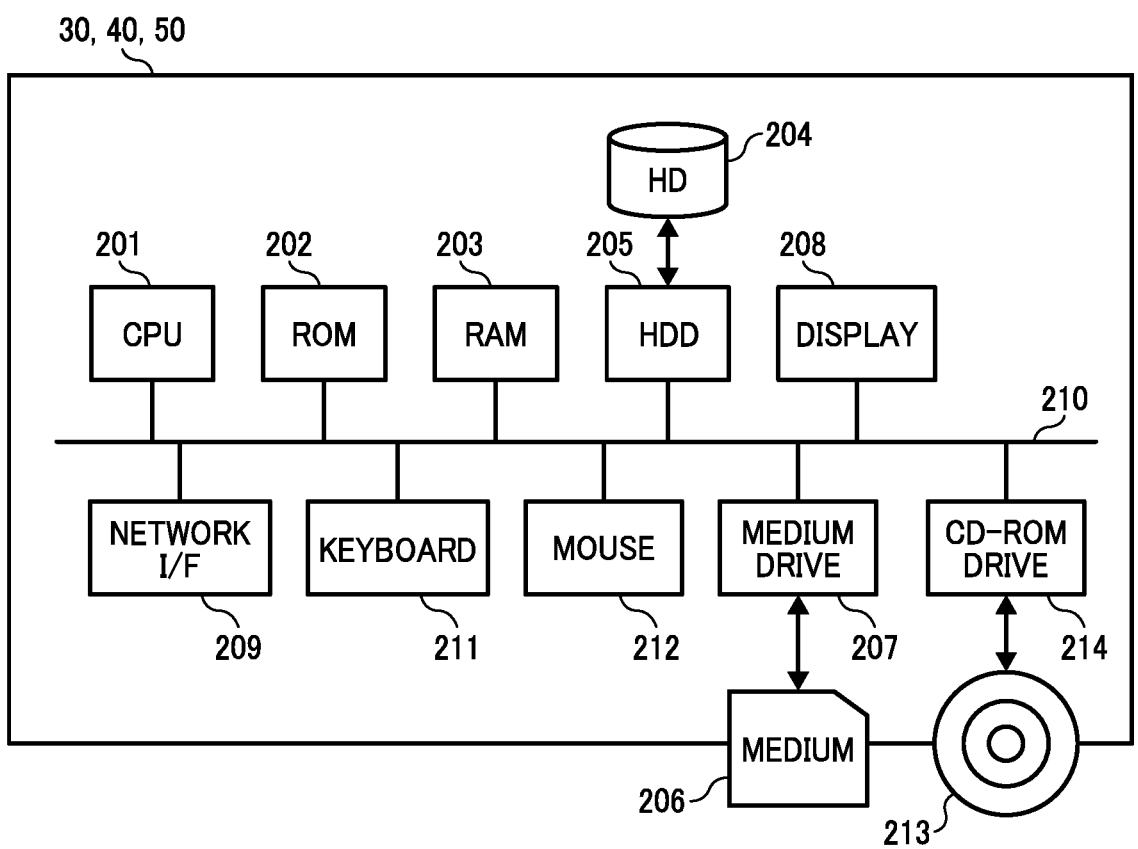
FIG. 5 is a schematic block diagram illustrating a hardware configuration of an external input apparatus, a communication management system, and a relay device of the communication system of FIG. 1.

FIG. 5 is a schematic block diagram illustrating a hardware configuration of the input apparatus 40, the communication management system 50, and the relay device 30 of the communication system 1, according to the embodiment. The management system 50 includes a CPU 201 that controls entire operation of the management system 50, a ROM 202 that stores a program used for driving the CPU 201 such as an IPL, a RAM 203 used as a work area for the CPU 201, the HD 204 that stores various types of data such as the communication management program, a hard disk drive (HDD) 205 that controls reading/writing of various types of data from/to the HD 204 under control of the CPU 201, a medium drive 207 that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions such as selection of a processing target or movement of the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements.

Since the relay device 30 and the input apparatus 40 each have a hardware configuration that is the same as or similar to that of the above-described management system 50, descriptions thereof are omitted. While the hardware is substantially the same, a control program stored in the HD 204 differs among the relay device 30, the input apparatus 40, and the management system 50.

Note that the control program for the communication terminal 10, the control program for the relay device 30, the control program for the input apparatus 40, and the control program for management system 50 may each be recorded in a file in a format installable or executable on a computer-readable recording medium for distribution. Examples of such recording medium include, but not limited to, compact disc-recordable (CD-R), digital versatile disc (DVD), and blue-ray disc.

<Functional Configuration of Communication System>

Figure 6:
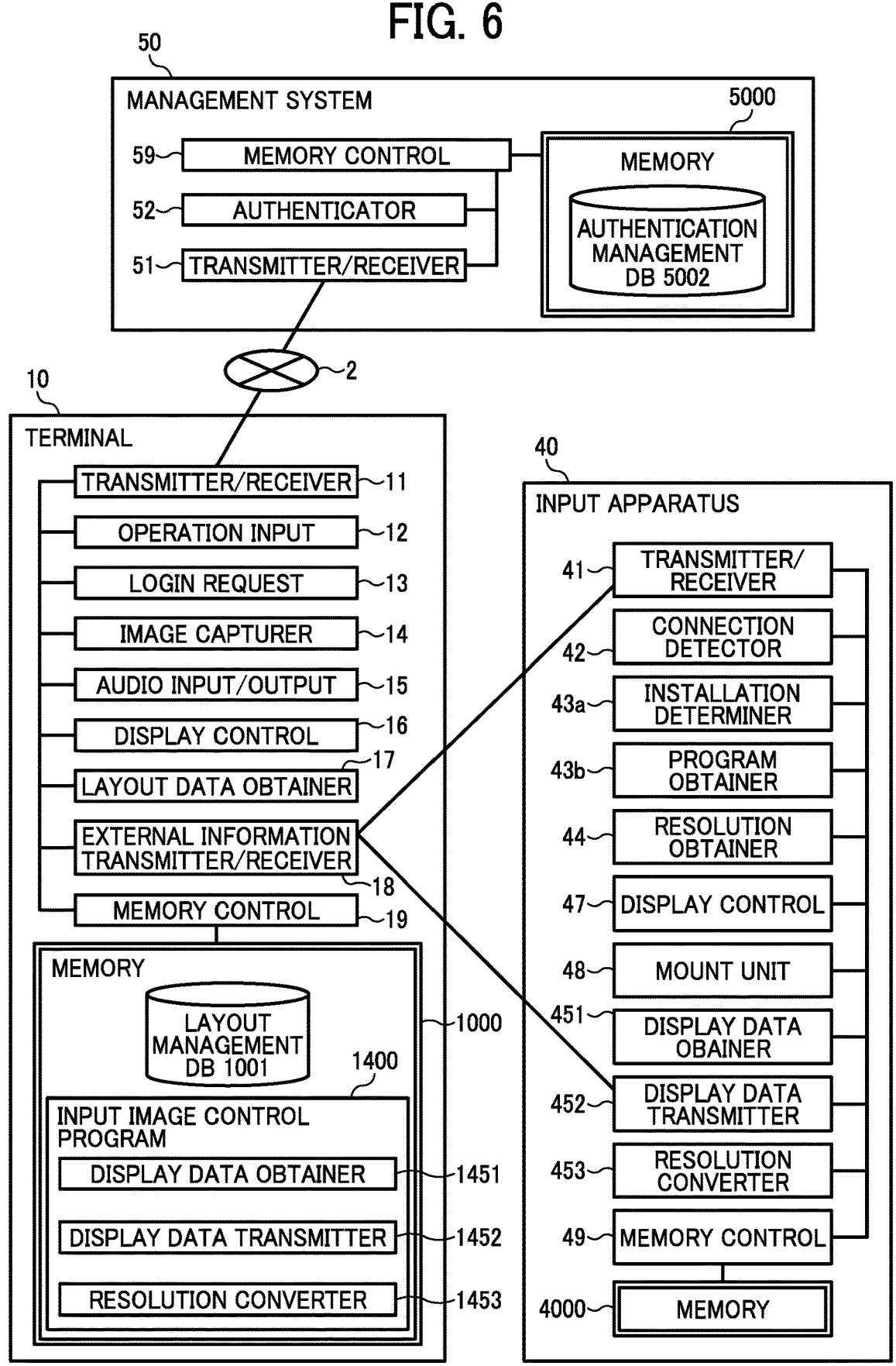
FIG. 6 is a schematic block diagram illustrating a functional configuration of the communication terminal, the external input apparatus, and the communication management system of the communication system of FIG. 1.

Now, a functional configuration of the communication system 1 is explained. FIG. 6 is a schematic block diagram illustrating a functional configuration of the terminal 10, the input apparatus 40, and the management system 50 in the communication system 1, according to the embodiment of the present invention. In FIG. 6, the terminal 10 and the management system 50 are connected through the communication network 2 to transmit or receive data. The terminal 10 and the input apparatus 40 are connected to transmit or receive data.

<Functional Configuration of Terminal>

The terminal 10 includes a transmitter/receiver 11, an operation input 12, a login request 13, an image capturer 14, an audio input/output 15, a display control 16, a layout data obtainer 17, an external data transmitter/receiver 18, and a memory control 19. These units are functions that are implemented by or that are caused to function by operating any of the hardware components illustrated in FIG. 4 in cooperation with the instructions of the CPU 101 according to the terminal control program expanded from the flash memory 104 to the RAM 103. The terminal 10 further includes a memory 1000 configured by the RAM 103 and the flash memory 104.

(Layout Management Table)

FIG. 7A is an illustration of an example data structure of a layout management table. The memory 1000 stores a layout management DB 1001, such as the layout management table of FIG. 7A. The layout management table of FIG. 7A stores, for each type of image data to be output through the display 120, an image data type, a priority in displaying the image data with such image data type, position information indicating a position at which such image data is displayed, and size information indicating a size of a display area of such image data. The priority is assigned to each image data type, such that, in displaying image data with more than one type, the image data having an image data type with a high priority (the small in number) is laid above the image data having an image data type with a low priority (the high in number). The position information indicates a position at which the image data is displayed on a screen. The position information in the layout management table defines the coordinate of the upper left corner of the displayed image in percentage. The value of percentage is defined such that the coordinate of the upper left corner of the display 120 corresponds to (0%, 0%), and the coordinate of the lower right corner of the display 120 corresponds to (100%, 100%). Further, in the table of FIG. 7A, the upper left corner of the displayed image is defined by the left coordinate and the top coordinate. The size information indicates a horizontal length and a vertical length of the display area for displaying the image data. The length may be expressed in number of pixels.

FIG. 7B illustrates an example image that is displayed according to information stored in the layout management table of FIG. 7A. More specifically, the layout management table of FIG. 7A indicates that the captured image transmitted from the counterpart terminal is assigned with the priority level "2", and the display image (input image) input from the input apparatus 40 is assigned with the priority level "1". The layout management table of FIG. 7A further includes the position information indicating that the captured image has the upper left corner (0, 0), and the size information indicating that the captured image has a size of (1920, 1080). That is, the captured image of 1920 pixels by 1080 pixels is displayed, with the upper left corner being at the position (0, 0). In case the display 120 has a resolution of (1920, 1080), the captured image D2 is displayed on a full screen as illustrated in FIG. 7B. The layout management table of FIG. 7A further includes the position information indicating that the display image (input image) has the upper left corner (0, 0), and the size information indicating that the display image has a size of (640, 480). That is, the display image of 640 pixels by 480 pixels is displayed, with the upper left corner being at the position (0, 0). Referring to FIG. 7B, the display image D1 is displayed at this position, over the captured image D2.

FIG. 7C illustrates an example case of changing the display area for displaying the image on a screen of the display 120. As a size of the display area changes, a size of the image to be displayed on the display area, which is managed with the layout management table of FIG. 7A, is changed accordingly. For example, in response to an instruction for enlarging the display area of the display data D1, the size information for the display area D1 is changed in the layout management table.

The memory 1000 stores an input image control program 1400, which is a control program for the input apparatus 40. The input image control program 1400 can be installed onto the input apparatus 40, as the input apparatus 40 mounts on the memory 1000. The input image control program 1400, when mounted, provides functions of a display data obtainer 1451, a display data transmitter 1452, and a resolution converter 1453. As the input image control program 1400 is transmitted to and installed onto the input apparatus 40, the input apparatus 40 deploys the input image control program 1400 for execution of these functions.

Referring to FIGS. 4 and 6, a functional configuration of the terminal 10 is described according to the embodiment. In the following description of the functional configuration of the terminal 10, relationships of the elements in FIG. 5 with the functional configuration of the terminal 10 in FIG. 6 will also be described.

The transmitter/receiver 11 of the terminal 10, which may be implemented by the instructions of the CPU 101, and the network I/F 111, transmits or receives various data (or information) to or from each terminal, device, or system.

The operation input 12, which may be implemented by the instructions of the CPU 101, the operation key 108, or the power switch 109, receives various inputs from the user.

The login request 13 may be implemented by the instructions of the CPU 101. For example, as the power is turned on, the login request 13 controls the transmitter/receiver 11 to automatically transmit login request information for requesting login, and a current IP address of the starting terminal 10, to the management system 50 through the communication network 2. In addition, when the user turns the power switch 109 from on to off, the transmitter/receiver 11 transmits to the management system 50 state information indicating that the power is to be turned off, and then the operation input 12 completely turns off the power. Accordingly, the management system 50 can detect that the power of the terminal 10 is turned from on to off.

The image capturer 14, which is implemented by instructions from the CPU 101 and by the camera 112 and the imaging element I/F 113, captures an image of a subject and outputs image data obtained by capturing the image.

The audio input/output 15 is implemented by the instructions of the CPU 101 illustrated in FIG. 4 and by the audio input/output I/F 116 illustrated in FIG. 4. After the sound of the user is converted to an audio signal by the microphone 114, the audio input/output 15 receives audio data according to this audio signal. The audio input/output 15 further outputs the audio signal according to the audio data to the speaker 115, and the speaker 115 outputs sound.

The display control 16, which may be implemented by the instructions of the CPU 101 and the display I/F 117, controls transmission of image data to the display 120.

The layout data obtainer 17, which may be implemented by the instructions of the CPU 101, searches the layout management table (FIG. 7A) to obtain various information such as the position information and the size information of each image to be displayed.

The external information transmitter/receiver 18, which may be implemented by the instructions of the CPU 101 and the external device connection I/F 118, transmits or receives various information with respect to the input apparatus 40.

The memory control 19, which may be implemented by the instructions of the CPU 101 and the SSD 105 illustrated in FIG. 4, stores various data in the memory 1000 or reads various data from the memory 1000. The memory 1000 stores a terminal identification (ID) for identifying each terminal 10, a password, and the like. Further, every time image data and audio data are received in performing communication with a counterpart terminal, the memory 1000 overwrites the image data and audio data. The display 120 displays an image based on image data before being overwritten, and the speaker 115 outputs sound based on audio data before being overwritten.

Note that a terminal ID and a later-described relay device ID in the embodiment are examples of identification information that is used to uniquely identify a specific terminal 10 and a specific relay device 30, respectively, such that a language, a character(s), a symbol(s), or various marks are not limited to the above-described embodiment. For example, a combination of at least two of the above-mentioned language, character(s), symbol(s), and various marks may be used as a terminal ID or a relay device ID. The terminal ID is any information used for identifying the terminal 10. For example, in case the terminal ID is associated with account information such as a user account of a specific user, the account information identifying a specific account may be used as the terminal ID.

<Functional Configuration of Management System>

The management system 50 includes a transmitter/receiver 51, an authenticator 52, and a memory control 59. These elements correspond to a plurality of functions of hardware elements in FIG. 5, which operate according to the instructions of the CPU 201 (FIG. 5) that are generated according to the communication management program read from the RAM 203 onto the HD 204. The management system 50 further includes a memory 5000, which may be implemented by the HD 204.

(Authentication Management Table)

Figure 9:
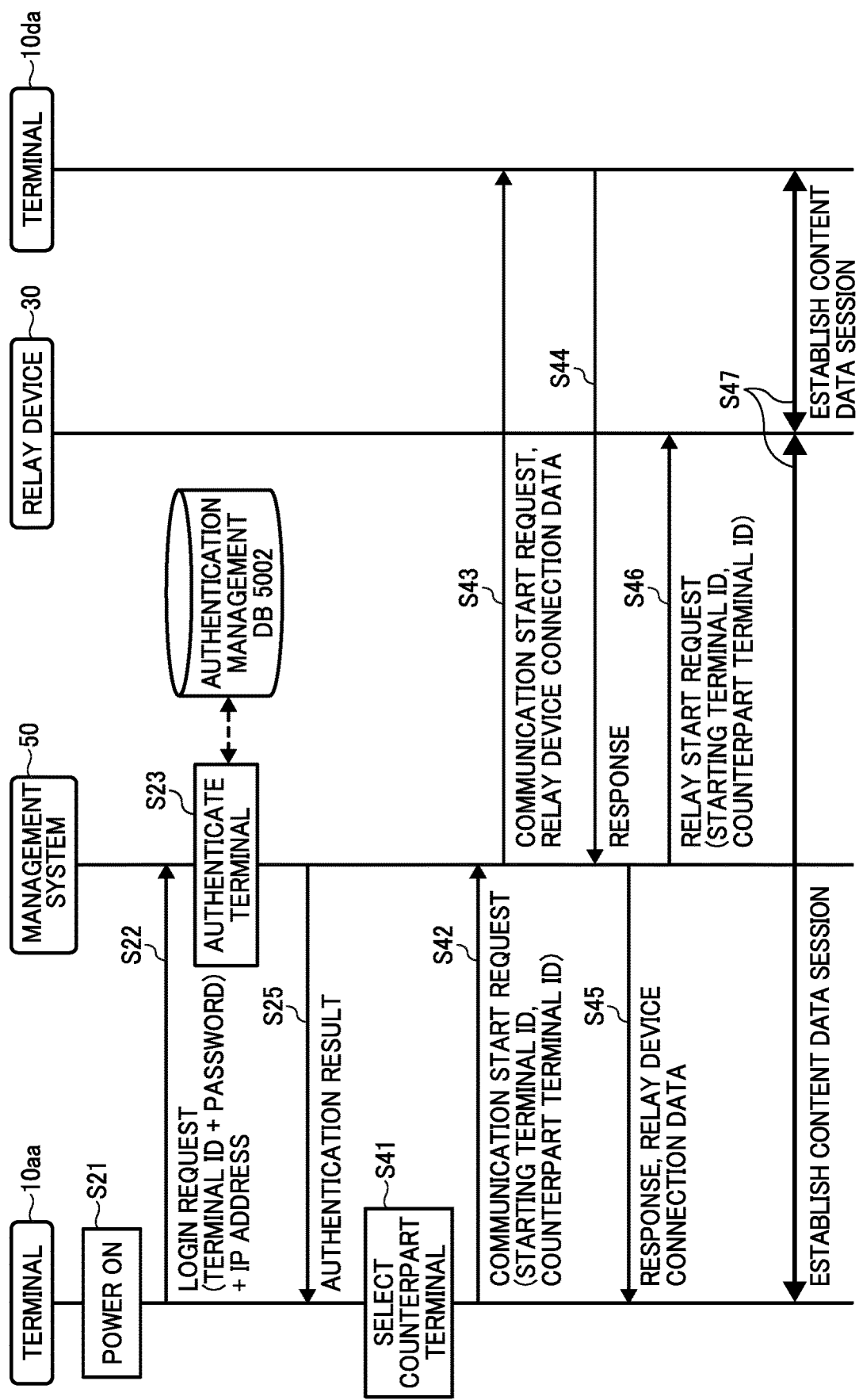
FIG. 9 is a data sequence diagram illustrating operation of preparing for starting communication between terminals, performed by the communication system of FIG. 1, according to an embodiment.

FIG. 9 is an illustration of an example data structure of an authentication management table. The memory 5000 stores an authentication management DB 5002, which may be implemented by the authentication management table of FIG. 8. In the authentication management table, for each one of the terminals 10 managed by the management system 50, the terminal ID and the password are stored in association with each other. For example, the authentication management table illustrated in FIG. 8 indicates that the terminal ID of the terminal 10aa is "01aa", and the password of the terminal 10aa is "aaaa".

(Functional Configuration of Management System)

Next, referring back to FIG. 6, a functional configuration of the management system 50 will be described in detail. In the following description of the functional configuration of the management system 50, relationships of the elements in FIG. 5 with the functional configuration of the management system 50 in FIG. 6 is also described.

The transmitter/receiver 51, which may be implemented by the instructions of the CPU 201 and the network I/F 209, transmits or receives various data (or information) to or from each terminal, device, or system through the communication network 2.

The terminal authenticator 52, which is implemented by the instructions of the CPU 201 illustrated in FIG. 5, performs terminal authentication by searching the terminal information management DB 5002 of the memory 5000 by using a terminal ID and a password included in login request information received via the transmitter/receiver 51 as search keys and determining whether the same pair of a terminal ID and a password is managed in the terminal information management table (FIG. 8).

The memory control 59, which may be implemented by the instructions of the CPU 201 and the HDD 205, or the instructions of the CPU 201, stores various data in the memory 5000 or reads various data from the memory 5000.

<Functional Configuration of Input Apparatus>

The input apparatus 40 includes a transmitter/receiver 41, a connection detector 42, an installation determiner 43a, a program obtainer 43b, a resolution obtainer 44, a display control 47, a mount unit 48, a display data obtainer 451, a display data transmitter 452, a resolution converter 453, and a memory control 49. These units are functions that are implemented by or that are caused to function by operating any of the hardware components illustrated in FIG. 5 in cooperation with the instructions of the CPU 201 according to the input apparatus control program expanded from the HD 204 to the RAM 203. The input apparatus 40 includes a memory 4000 configured by the HD 204 illustrated in FIG. 5.

The transmitter/receiver 41, which may be implemented by the instructions of the CPU 201 and the network I/F 209, transmits or receives various data (or information) to or from the terminal 10.

The connection detector 42, which may be implemented by the instructions of the CPU 201 and the network I/F 209, detects a connection between the input apparatus 40 and the terminal 10.

The installation determiner 43a, which may be implemented by the instructions of the CPU 201, determines whether the input apparatus 40 is installed with the input image control program, such as the program that operates as the display data obtainer 1451, display data transmitter 1452, and resolution converter 1453.

The program obtainer 43b, which may be implemented by the instructions of the CPU 201, receives the input image control program from the memory 1000 of the terminal 10, such as the program that operates as the display data obtainer 1451, display data transmitter 1452, and resolution converter 1453.

The resolution obtainer 44, which may be implemented by the instructions of the CPU 201, obtains a resolution of the display 208, and resolution information indicating a resolution of a display area of the terminal 10.

The display control 47, which may be implemented by the instructions of the CPU 201 in cooperation with the display 208, controls the display 208 to display image data as display data.

The mount unit 48, which may be implemented by the instructions of the CPU 201, mounts the memory 1000 of the terminal 10 to cause the input image control program 1400 to be installed onto the input apparatus 40.

The display data obtainer 451, which may be implemented by the instructions of the CPU 201, obtains image data being displayed on the display 208, as display data.

The display data transmitter 452, which may be implemented by the instructions of the CPU 201 and the network I/F 209, transmits image data to the terminal 10 for display.

The resolution converter 453, which may be implemented by the instructions of the CPU 201, converts a resolution of display data to be transmitted to the terminal 10, based on a resolution of the display 208 for the input apparatus 40 and a resolution of a display area of the terminal 10.

The memory control 49, which may be implemented by the instructions of the CPU 201 and the HDD 205, or the instructions of the CPU 201, stores various data in the memory 4000 or reads various data from the memory 4000.

<Operation>

Now, operation of starting communication between the terminals 10aa and 10da is described according to an embodiment. FIG. 9 is a data sequence diagram illustrating operation of starting communication between the terminals 10aa and 10da.

When the user of a starting terminal (terminal 10aa) turns on the power switch 109 illustrated in FIG. 3, the operation input 12 illustrated in FIG. 6 accepts the power on operation and turns on the power (S21). In response to acceptance of the power on operation, the login request 13 automatically transmits login request information indicating a login request from the transmitter/receiver 11 to the management system 50 via the communication network 2 (S22). The login request information includes a terminal ID for identifying the terminal 10aa, which is a local terminal serving as the starting terminal, and a password. The terminal ID and the password are data that have been read via the memory control 19 from the memory 1000 and sent to the transmitter/receiver 11. In the case of transmitting login request information from the terminal 10aa to the management system 50, the management system 50, which is a receiving side, can obtain the IP address of the terminal 10aa, which may be received from the terminal 10aa with the login request information.

Next, the authenticator 52 of the management system 50 performs terminal authentication by searching the authentication management table (FIG. 8) of the memory 5000 by using the terminal ID and the password included in the login request information received via the transmitter/receiver 51 as search keys, and determining whether the same terminal ID and the same password are managed in the authentication management table (S23).

The transmitter/receiver 51 of the management system 50 transmits authentication result information indicating an authentication result obtained by the authenticator 52 to the starting terminal (terminal 10aa) which has sent the above-mentioned login request, via the communication network 2 (S25). In the embodiment, the case in which it has been determined by the authenticator 52 that the terminal 10aa is a terminal that has a legitimate use authority will be described as follows. Further, in the following, it is assumed that the terminal 10da has logged in the management system 50 in a substantially similar manner as described above referring to S21 to S25.

As the user at the terminal 10aa presses the operation keys 108 illustrated in FIG. 3 and selects the terminal 10da as a counterpart, the operation input 12 illustrated in FIG. 6 accepts a request for starting communication with the counterpart terminal 10da (S41). The transmitter/receiver 11 of the starting terminal (terminal 10aa) transmits, to the management system 50, start request information (communication start request) indicating a request for starting communication (S42). The communication start request includes the terminal ID "01aa" of the terminal 10aa, and the terminal ID ("01da") of the counterpart terminal (terminal 10da).

The transmitter/receiver 51 of the management system 50 transmits the communication start request, to the terminal 10da that is the counterpart terminal for the terminal 10da (S43). The transmitter/receiver 51 of the management system 50 transmits, to the terminal 10da, relay device connection data to be used for connecting with the relay device 30. The relay device connection data includes the IP address of the relay device 30, authentication information to be used for authentication such as the password, a port number, etc.

As the communication start request is received, the transmitter/receiver 11 of the counterpart terminal 10da transmits, to the management system 50, start permission information (response) indicating to accept the communication start request in response to the communication start request (S44). The transmitter/receiver 51 of the management system 50 transmits the response accepting the communication start request, to the terminal 10aa that is the starting terminal (S45). The transmitter/receiver 51 of the management system 50 transmits, to the terminal 10aa, relay device connection data to be used for connecting with the relay device 30.

The transmitter/receiver 51 of the management system 50 transmits relay request information (relay start request) to the relay device 30, which requests for relaying of content data between the starting terminal 10aa and the counterpart terminal 10da. The transmitter/receiver 11 of each of the terminal 10aa and the terminal 10da transmits the relay device connection data that is received from the management system 50, to the relay device 30 to connect to the relay device 30. The starting terminal 10aa and the counterpart terminals 10da each establish a content data session "sed" with the relay device 30 (S47). The transmitter/receiver 11 of each of the terminal 10aa and the terminal 10da transmits or receives image data and audio data to or from the relay device 30 through the established content data session "sed". Accordingly, the starting terminal 10aa and the counterpart terminal 10da can exchange image data and audio data therebetween.

Figure 10:
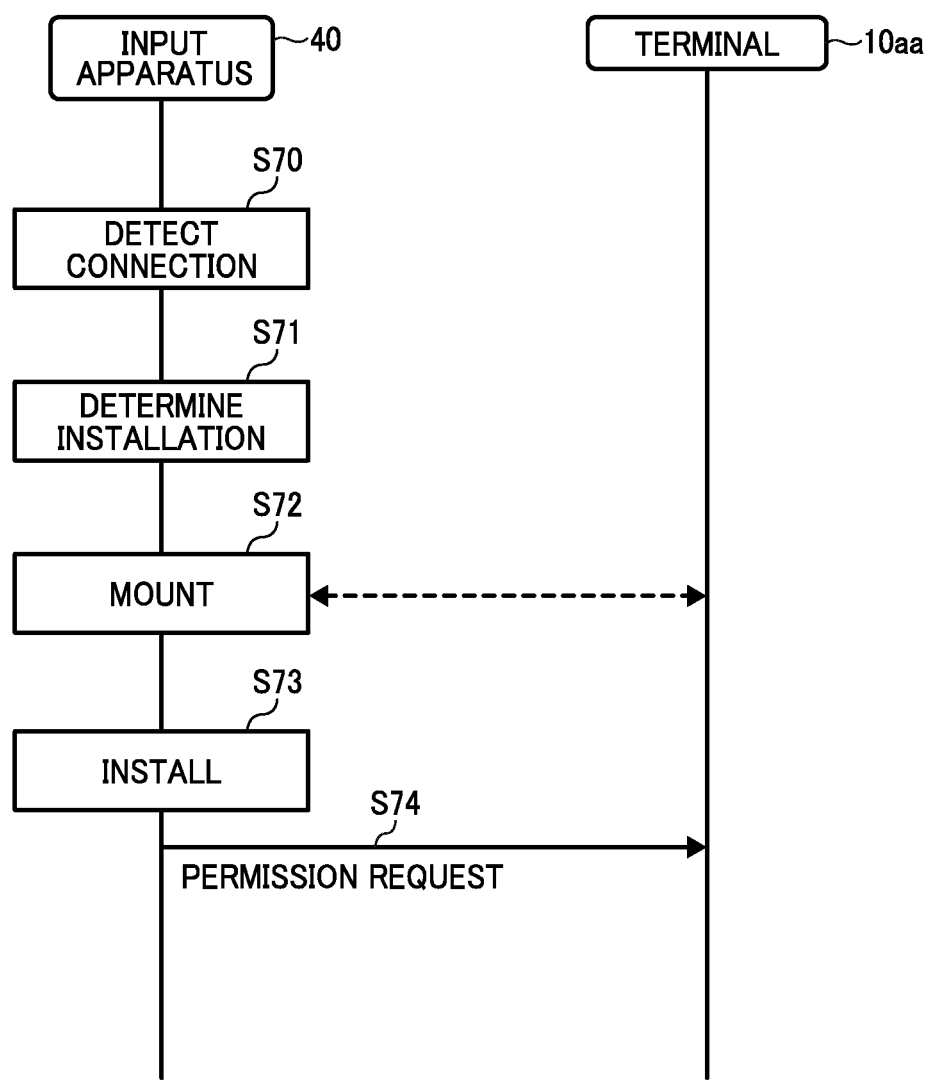
FIG. 10 is a data sequence diagram illustrating operation of installing an input image control program onto an input apparatus, according to an embodiment.

FIG. 10 is a data sequence diagram illustrating operation of installing the input image control program 1400 onto the input apparatus 40, according to an embodiment. Referring to FIG. 10, operation of installing the input image control program 1400 (more specifically, the display data obtainer 1451, the display data transmitter 1452, and the resolution converter 1453), onto the input apparatus 40, is described according to the embodiment. As the input apparatus 40 connects with the terminal 10aa through a communication cable, the connection detector 42 of the input apparatus 40 detects connection with the terminal 10aa (S70). In response to detection of connection, the installation determiner 43a determines whether the input apparatus 40 is installed with the input image control program 1400 to have the functions of the display data obtainer 1451, the display data transmitter 1452, and the resolution converter 1452 (S71).

When it is determined that any one of the programs (or functions) of the input image control program 1400 is not installed ("NO" at S71), the mount unit 48 mounts the memory 1000 of the terminal 10aa onto the input apparatus 40 (S72). The program obtainer 43b obtains any one of the programs of the input image control program 1400 (more specifically, the display data obtainer 1451, the display data transmitter 1452, and the resolution converter 1453), from the memory 1000 of the terminal 10aa, and install the obtained program onto the input apparatus 40 (S73). Accordingly, the input apparatus 40 is installed with the input image control program 1400 to implement the display data obtainer 1451, the display data transmitter 1452, and the resolution converter 1453.

As the input image control program 1400 is installed, the transmitter/receiver 41 transmits a request for permitting execution of the input image control program 1400 (the display data obtainer 1451, the display data transmitter 1452, and the resolution converter 1453) to the terminal 10aa (S74). In response to acceptance of the permission request from the terminal 10aa, the input apparatus 40 executes the input image control program 1400 (the display data obtainer 1451, the display data transmitter 1452, and the resolution converter 1453).

Figure 11:
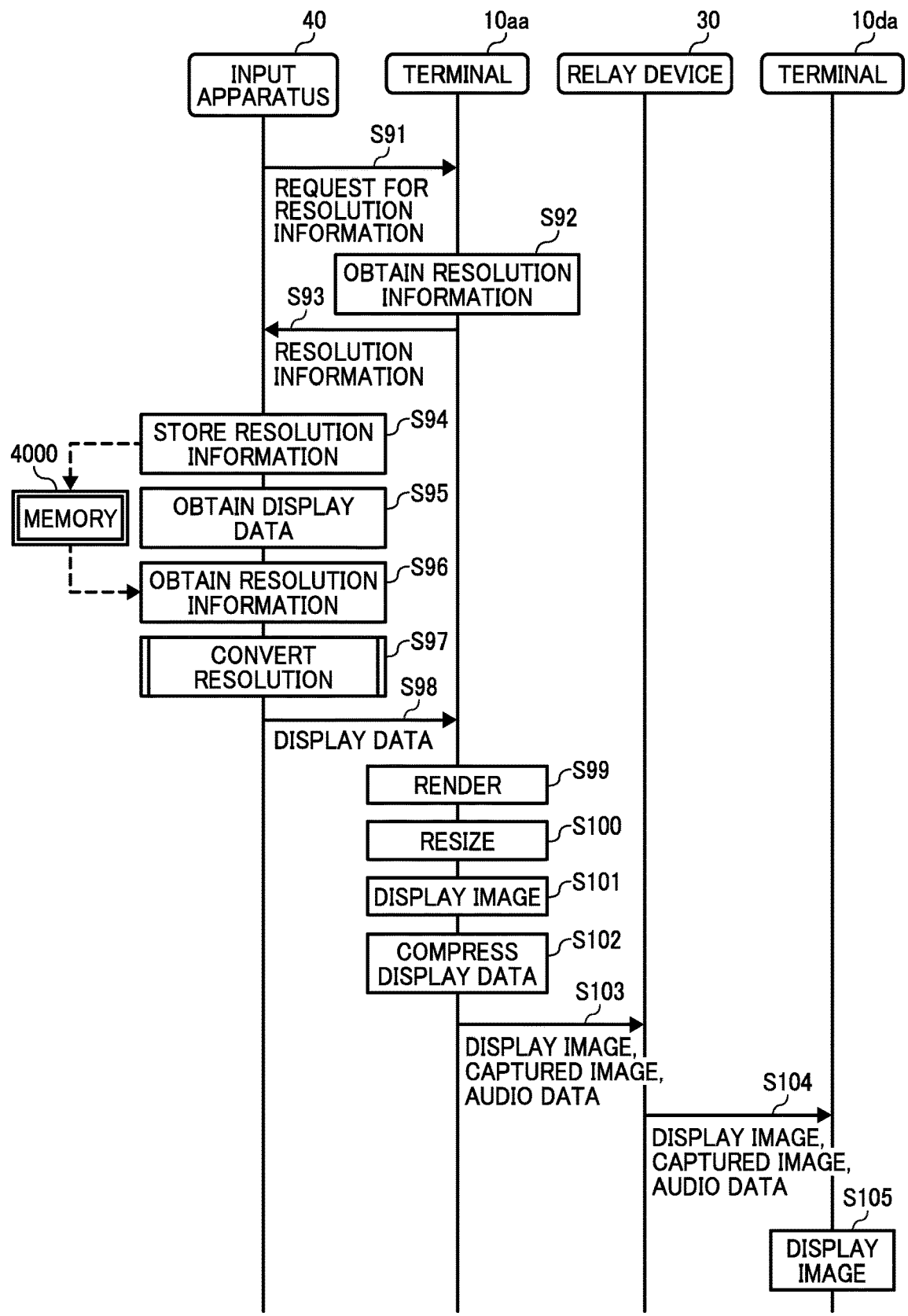
FIG. 11 is a data sequence diagram illustrating operation of converting resolution of display data, performed by the communication system of FIG. 1, according to an embodiment.

FIG. 11 is a data sequence diagram illustrating operation of processing conversion of display data, according to an embodiment. Referring to FIG. 11, operation of processing conversion of display data, transmitted from the input apparatus 40 to the terminal 10, is described according to the embodiment.

The transmitter/receiver 41 of the input apparatus 40 transmits a request for resolution information indicating a resolution of a display area for displaying the display image, to the terminal 10aa (S91). In this embodiment, the resolution is not expressed in dots per inch (dpi), but expressed in number of image pixels. As the external data transmitter/receiver 18 of the terminal 10aa receives the request for resolution information, the layout obtainer 17 refers to the layout management table to obtain a size of the display area for displaying the display image (S92). The example case where the default size (640, 480) of the display area is obtained at S92 is described below. As the size of the display area is received at the layout data obtainer 17, the external information transmitter/receiver 18 transmits resolution information indicating a resolution corresponding to the obtained display area size, to the input apparatus 40 (S93). The resolution corresponding to the obtained display area size may be set equal to the obtained display area size (640, 480). Alternatively, the resolution may be obtained by multiplying the display area size with a positive integer of more than one, such that the resolution can be proportional to the display area size.

The transmitter/receiver 41 of the input apparatus 40 receives the resolution information transmitted from the terminal 10aa. The memory control 49 of the input apparatus 40 stores the received resolution information in the memory 4000 (S94).

The display data obtainer 451 of the input apparatus 40 captures an image being displayed on the display 208 under control of the display control 47, to obtain display data (S95). The display data, when being captured, has a resolution that is determined by the resolution of the display 208. In one example, the display 208 has a resolution (1280, 960), such that the display image has a resolution (1280, 960).

The resolution obtainer 44 accesses the display 208 to obtain a resolution of the display 208, and further obtains the resolution information stored in the memory 4000 (S96). The resolution converter 453 converts the obtained resolution of the display data, to a resolution indicated by the resolution information obtained from the memory 4000 (S97). For example, the resolution converter 453 converts the display data having the resolution (1280, 960), to the display data having the resolution (640, 480) as indicated by the stored resolution information. In case an aspect ratio of a display image based on the display data differs from an aspect ratio of a display area of the terminal 10aa, the resolution converter 453 converts one of a horizontal resolution and a vertical resolution of the display data to match the corresponding one of the horizontal resolution and the vertical resolution of the stored resolution information (640, 480).

Figure 12:
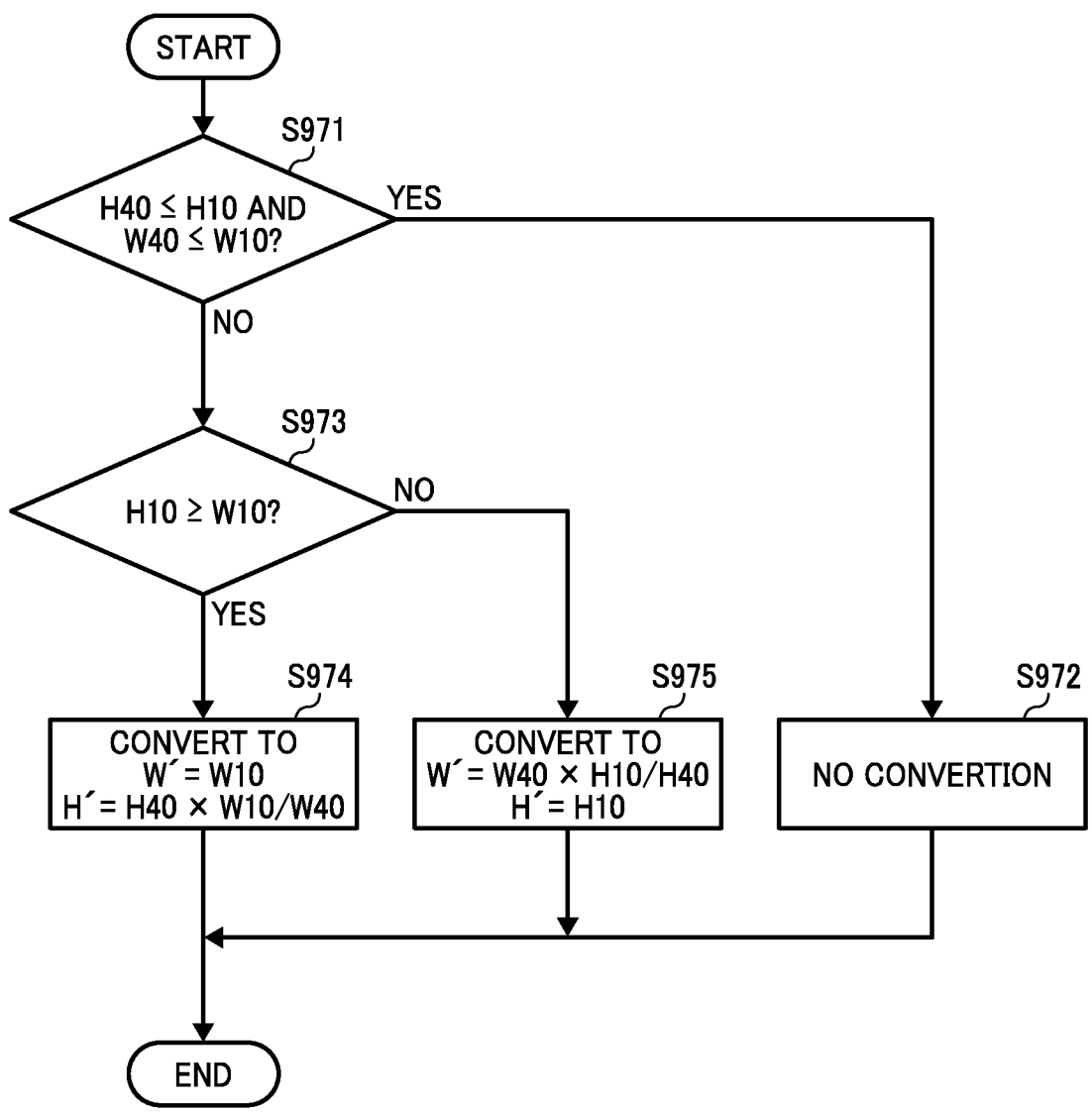
FIG. 12 is a flowchart illustrating operation of converting resolution of display data, performed by the external input apparatus, according to an embodiment.

The operation of S97 is described in detail referring to FIG. 12. FIG. 12 is a flowchart illustrating operation of converting resolution of display data, according to an embodiment. In the following, the vertical resolution (the height) and the horizontal resolution (the width) of the display 208 of the input apparatus 40 (that is, the resolution of the display data) are referred to as H40 and W40, respectively. The vertical resolution (the height) and the horizontal resolution (the width) of the display area of the terminal 10aa are referred to as H10 and W10, respectively. The resolution converter 453 convert the display data to have the vertical resolution H', and the horizontal resolution W', as described below.

The resolution converter 453 determines whether H40 is equal to or less than H10, and W40 is equal to or less than W10 (S971). When it is determined that H40 is equal to or less than H10, and W40 is equal to or less than W10 ("YES" at S971), the resolution converter 453 determines not to perform any conversion, and the operation proceeds to S972. In such case, the resolution converter 453 sets the vertical resolution H' and the horizontal resolution W' of the display data, respectively, to H40 and W40 of the display 208. That is, when the resolution of the display data (depending on the display 208) is equal to or less than the resolution of the display area of the terminal 10aa, the resolution converter 453 determines that no conversion is necessary, as the display image can be displayed on the display area without conversion.

When it is determined that H40 is greater than H10, or W40 is greater than W10 ("NO" at S971), the resolution converter 453 determines that conversion is necessary, and the operation proceeds to S973. At S973, the resolution converter 453 further determines whether H10 is equal to or greater than W10.

When it is determined that H10 is equal to or greater than W10 ("YES" at S973), the operation proceeds to S974. At S974, the resolution converter 453 converts the display data, such that the display data has the horizontal resolution W' that is equal to W10, and the vertical resolution H' that is equal to H40*W10/W40. Here, W10/W40 is a compression ratio. The aspect ratio of the converted display data W':H' is W10:H40*W10/W40, that is, W40:H40. As described above, this conversion does not change the aspect ratio of the display data, but converts the horizontal resolution of the display data to that of the display area of the terminal 10.

When it is determined that W10 is greater than H10 ("NO" at S973), the operation proceeds to S975. At S975, the resolution converter 453 converts the display data, such that the display data has the horizontal resolution W' that is equal to W40*H10/H40, and the vertical resolution H' that is equal to H10. Here, H10/H40 is a compression ratio. The aspect ratio W':H' of the converted display data is W40*H10/H40:H40, that is, W40:H40. As described above, this conversion does not change the aspect ratio of the display data, but converts the vertical resolution of the display data to that of the display area of the terminal 10.

As the resolution of the display data is converted at the resolution converter 453, at S98 of FIG. 11, the display data transmitter 452 transmits the display data, which is converted, to the terminal 10aa. In this embodiment, the display data transmitter 452 of the input apparatus 40 may encode the display data in a predetermined encoding format, before transmitting to the terminal 10aa.

The external information transmitter/receiver 18 of the terminal 10aa receives the display data transmitted from the input apparatus 40. In case the display data is encoded, the external information transmitter/receiver 18 decodes the encoded display data. The display control 16 renders the received display data (S99) to obtain the display data having the resolution as indicated by the resolution information. The display control 16 resizes an image of the display data so as to match the size of a display image stored in the layout management table (FIG. 7A) (S100). The display control 16 further causes the display image, which is resized, to be displayed at a position as indicated by the position information stored in the layout management table (FIG. 7A) (S101). When the display data is converted at S974 or S975 of FIG. 12, the display control 16 may cause the display image of the converted display data at a center section of the display area of the terminal 10. In such case, the display area may have a blank area, for example, at upper and lower portions or right and left portions of the screen. Further, referring to the priority information stored in the layout management table (FIG. 7A), the display control 16 may cause the display image be superimposed on the captured image. The captured image may be an image captured at the camera 112 of the terminal 10aa, or an image captured and transmitted from the counterpart terminal 10da through the content data communication session "sed".

The transmitter/receiver 11 of the terminal 10aa obtains the display data, which is the display image being displayed on the display 120, and encodes (compresses) the obtained display data in the predetermined encoding format to generate the display data for transmission (S102). The predetermined encoding format may be any desired encoding format, as long as it is compatible with a communication protocol of the content data communication session "sed".

The transmitter/receiver 11 of the terminal 10aa transmits, to the relay device 30, the display data that is generated at S102 for transmission through the content data communication session "sed" (S103). The transmitter/receiver 11 of the terminal 10aa further transmits, to the relay device 30, data of the captured image captured by the camera 112 at the terminal 10aa, and audio data that is collected by the microphone 114 at the terminal 10aa, for transmission through the content data communication session "sed". The relay device 30 transmits the display data, the image data of the captured image, and the audio data, which are received from the terminal 10aa, to the counterpart terminal 10da through the content data communication session "sed" (S104). The transmitter/receiver 11 of the terminal 10da receives the display data, image data, and audio data from the relay device 30. In case the display data is encoded, the transmitter/receiver 11 decodes the display data. The display control 16 of the terminal 10da controls the display 120 to display an image based on the decoded display data (S105). Similarly, the display control 16 of the terminal 10da causes the display 120 to display an image of the received image data, such as the captured image transmitted from the terminal 10aa.

Figure 13:
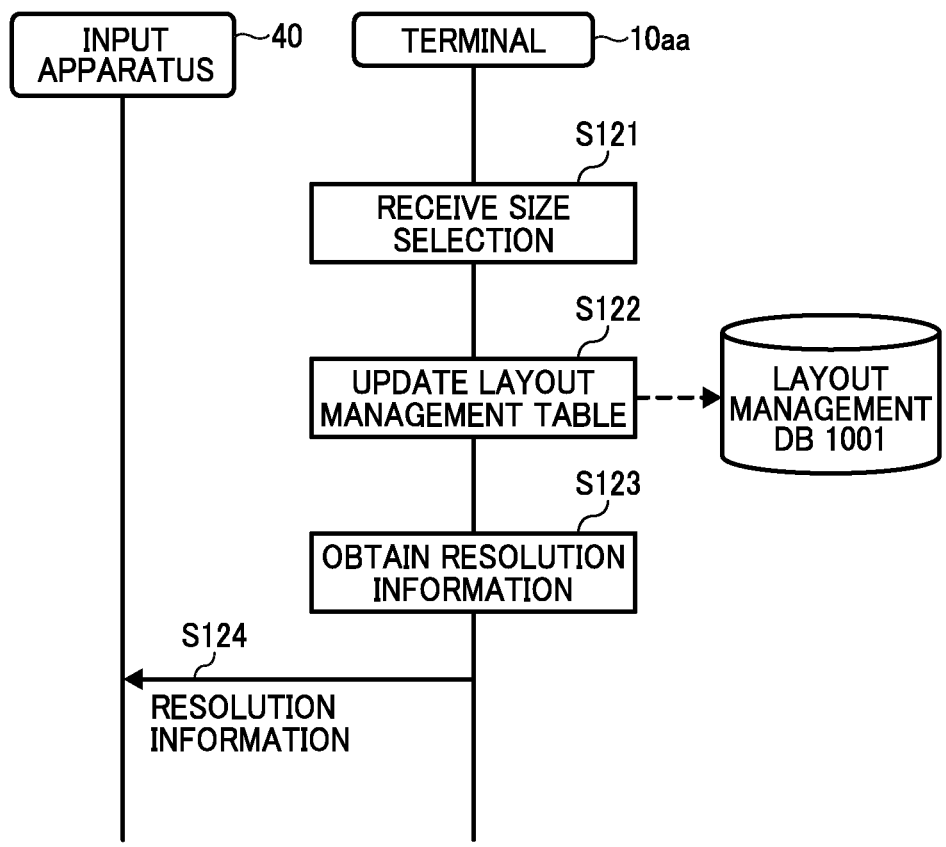
FIG. 13 is a data sequence diagram illustrating operation of changing a size of a display area for displaying display data, performed by the terminal, according to an embodiment.

Referring to FIG. 13, operation of changing a size of the display area for displaying the display image is described according to an embodiment. FIG. 13 is a data sequence diagram illustrating operation of changing a size of the display area for displaying the display image. The operation may be performed at any desired time, for example, before or after displaying the display image at the terminal 10aa.

For example, the user at the terminal 10aa may change a size of the display area of the display 120 with a pointer such as the mouse as illustrated in FIG. 7C. In response to the user operation for changing the size of the display area, the operation input 12 of the terminal 10aa accepts a request for changing the size of the display area (S121). The following describes an example case in which the request for changing the size of the display area, from (640, 480) to (1280, 960).

The memory control 19 of the terminal 10aa updates the layout management table (FIG. 7A) to change the size of the display image from (640, 480) to (1280, 960) (S122).

The layout data obtainer 17 of the terminal 10aa obtains size information indicating the updated size of the display image, which is (1280, 960), from the layout management table (S123). Further, the layout data obtainer 17 calculates a resolution corresponding to the obtained size of the display image. The external information transmitter/receiver 18 transmits resolution information, which indicates the resolution corresponding to the obtained size of the display image, to the input apparatus 40 (S124). The resolution corresponding to the obtained size of the display image may be set equal to the obtained size (1280, 960), or to any value larger but proportional to the obtained size. That is, the resolution to be transmitted depends on the size of the display image.

The operation to be performed after transmission of the resolution information to the input apparatus 40 is performed in a substantially similar manner as described above referring to S94 to S105 of FIG. 11, such that its description is omitted. However, in this example, the resolution information transmitted at S124 is greater than the resolution information transmitted at S93. In such case, until the resolution of the display area (W10, H10) becomes equal to or greater than the resolution of the display 208 (W40, H40) ("YES" at S971), the resolution of the display image, which is transmitted from the input apparatus 40 to the terminal 10, increases according to the user operation. Accordingly, as the size of the display area for displaying the display image increases in response to the user instruction, the resolution of the display image increases. This suppresses the sudden change in image quality due to the change in display area size. Further, as described above referring to S124, the resolution information corresponding to the display area size selected by the user at the terminal 10aa is transmitted to the input apparatus 40. The input apparatus 40 generates image data having the resolution indicated by the received resolution information for transmission. As the display image is converted at the input apparatus 40, the terminal 10aa can easily display the received display image on the display area of the screen.

The above-described operation of displaying the display image may be performed in various other ways. For example, the terminal 10aa does not have to have information indicating the size of the display image in the layout management table, at the time when the request for resolution information is received at S91. For example, when the request for resolution information is transmitted from the input apparatus 40 to the terminal 10aa (S91), the input apparatus 40 may also transmit resolution information indicating the resolution of the display 208 of the input apparatus 40 to the terminal 10aa. As the external information transmitter/receiver 18 of the terminal 10aa receives the resolution information, the memory control 19 stores a size corresponding to the resolution of the display 208 that is received from the input apparatus 40, in the layout management table in a field for the display image. As the aspect ratio of the display area at the terminal 10aa becomes equal to the aspect ratio of the display 208, the display area does not have a blank space at upper and lower portions or right and left portions of the display image.

In case of receiving a request for changing a size of the display area at S121, the operation input 12 may accept such request for changing a size of the display area such that an aspect ratio remains the same as the aspect ratio being managed with the layout management table. By keeping the aspect ratio the same, even when the size of the display area changes, the display area does not have a blank space at upper and lower portions or right and left portions of the display image.

As described above, the terminal 10 obtains display area information indicating a size of a display area of the display 120 for displaying a display image that is being generated and displayed at the input apparatus 40. In one example, the display area information corresponds to a user operation that designates a size of the display area with, for example, a pointer. In another example, the display area information may be obtained from a memory.

The terminal 10 transmits, to the input apparatus 40, resolution information that indicates a resolution of image data that matches the size of the display area. Based on the resolution information, the input apparatus 40 converts the display image having a resolution of the display 208, to match the resolution of the display area of the display 120 as indicated by the resolution information transmitted from the terminal 10. The terminal 10 receives the display image having the resolution as indicated by the resolution information, from the input apparatus 40. The terminal 10 causes the display 120 to display the display image on the display area.

Accordingly, even when displaying the display image that is input from the input apparatus 40 (such as the display image being displayed at the input apparatus 40), in a display area of the display 120 for the terminal 10, the input apparatus 40 converts the display image to have the resolution that matches the display area of the display 120 for the terminal 10. This enables the display image, input from the input apparatus 40, to be appropriately displayed in the display area.

Even when a request for re-sizing the display area is received, the terminal 10 sends resolution information that is updated to reflect the change to the input apparatus 40, to cause the input apparatus 40 to send the display image having the resolution that matches the updated resolution information.

Further, the terminal 10 stores in the memory 1000 the input image control program 1400, such as the resolution converter 1453 for converting resolution of image data. The terminal 10 can provide such program to any desired external apparatus to cause the external apparatus to operate as the input apparatus 40.

In one example, the input apparatus 40 determines whether the resolution converter 1453 is installed onto the input apparatus 40. When it is determined that the resolution converter 1453 is not installed, the input apparatus 40 requests the terminal 10 for resolution converter 1453.

In alternative to converting the display image to have the resolution that matches the display area of the display 120 for the terminal 10, the display area of the display 120 for the terminal 10 may be adjusted to match an aspect ratio of the display 208 for the input apparatus 40. More specifically, based on information indicating an aspect ratio of the display image (resolution information) that is transmitted from the input apparatus 40, the terminal 10 determines a size of the display area. Since the aspect ratio becomes the same between the display image and the display area, the display image can be appropriately displayed in the display area, without any blank at upper and lower portions, or at right and left portions.

The terminal 10, when communicating with one or more counterpart communication terminals 10, further transmits the display image that is received from the input apparatus 40 to the one or more counterpart communication terminals 10 through the network 2.

In the communication system 1, in addition to captured images each being captured at the terminal 10, the display image input from the external input apparatus 40 can be shared among the terminals 10.

The terminal 10, the relay device 30, the input apparatus 40, and the management system 50 in any one of the above-described embodiments may be configured by a single computer or a plurality of computers to which divided portions (functions) are arbitrarily allocated.

In addition, a memory storing any one of the above-described control programs, such as a recording medium including a CD-ROM or the HD 204, may be provided in the form of a program product to users within a certain country or outside that country.

Although the IP address of each terminal 10 is managed in the above-described embodiment, the embodiment is not limited to this case, such that a fully qualified domain name (FQDN) of each terminal 10 may be managed instead, or any other identification information for identifying the terminal 10 on the communication network 2. In this case, an IP address corresponding to an FQDN is obtained by a Domain Name System (DNS) server of the related art.

In addition, although the case of a videoconference system has been described as an example of the communication system 1 in the above-described embodiment, the embodiment is not limited to this case, such that the communication system 1 may be a phone system such as an IP phone system or an Internet phone system. The communication system 1 may be a telephone system including a mobile phone. In such case, the terminal 10 may correspond to a phone, such as the mobile phone.

That is, any display control apparatus capable of controlling display of image data received from the external apparatus as described above can operate as the terminal 10 of any one of the above-described embodiments. Examples of such display control apparatus include, but not limited to, a smart phone, a smart watch, a mobile phone, a car navigation terminal, a wearable computer, a monitoring camera, a digital camera communicable using WiFi, any communication device (a projector, a game machine), a digital signage, and industrial equipment with a communication function. A wearable computer includes a watch and a head-mounted display. Industrial equipment includes office equipment such as a multifunction peripheral (MFP)/printer/product, medical equipment such as an endoscope and a Computed Tomography (CT) scan, and agricultural equipment such as a cultivator.

In the above-described embodiments, the input apparatus 40 is implemented by a general-purpose computer, however, the input apparatus 40 may be implemented in various other ways. For example, any apparatus that can be installed with the input image control program 1400 may operate as the input apparatus 40 such as a mobile phone, tablet, videoconference terminal, electronic whiteboard, etc.

In addition, although the case in which a videoconference is held by the communication system 1 has been described in the above-described embodiment, the embodiment is not limited to this case. The communication system 1 may be used in meetings, general conversation between family members or friends, or one-way presentation of information.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

The invention claimed is:

1. A communication terminal connectable to a counterpart communication terminal via a communication network, comprising:
   circuitry configured to
      transmit a program, executable on an information processing device connectable to the communication terminal, to the information processing device, in response to a request from the information processing device, after the information processing device is connected to the communication terminal,
      control display of images on a first display provided for the communication terminal, the images including a first image generated from first image data at the communication terminal and a second image generated at the information processing device, and obtain display area information indicating a size of a display area of the first display for displaying the second image,
      receive user input of a change in size of the display area for displaying the second image to a new size, and update, in a memory, particular size information stored in association with an image data type of the second image to the new size,
      transmit, to the information processing device, resolution information indicating a resolution calculated based on the new size,
      receive, from the information processing device in response to execution of the program on the information processing device, second image data corresponding to an image being displayed on a display screen of the information processing device and having the calculated resolution, and
      control the first display to display the second image in the display area based on the second image data received from the information processing device.

2. The communication terminal of claim 1, wherein the circuitry is further configured to transmit, to the counterpart communication terminal via the communication network the second image data received from the information processing device.

3. The communication terminal of claim 1, further comprising the memory, which stores each of size information, position information, and priority information in association with an image data type, for each of a plurality of image data types including a first image data type and a second image data type.

4. A communication system, comprising:
   the communication terminal of claim 1; and
   the information processing device, the information processing device including processing circuitry configured to execute the program, which causes the information processing device to transmit the second image data to the communication terminal.

5. The communication system of claim 4, wherein the information processing device is connected to the communication terminal via a USB cable.

6. The communication system of claim 4, wherein the processing circuitry is further configured to determine whether the information processing device is connected to the communication terminal.

7. The communication system of claim 6, wherein the processing circuitry is further configured to, when determining that the information processing device is connected to the communication terminal, determine whether the program is installed on the information processing device, and if not, obtain the program from the communication terminal and install the program.

8. The communication system of claim 4, wherein the processing circuitry is further configured to obtain permission from the communication terminal prior to executing the program.

9. The communication system of claim 4, wherein the information processing device further comprises a display to display the image corresponding to the second image data.

10. The communication system of claim 4, further comprising:
    the counterpart communication terminal, wherein the counterpart communication terminal includes
       a receiver to receive the second image data; and
       a display to display the second image corresponding to the second image data.

11. A method of communicating performed by a communication terminal, comprising:
    transmitting a program, executable on an information processing device connectable to the communication terminal, to the information processing device, in response to a request from the information processing device, after the information processing device is connected to the communication terminal;
    controlling display of images on a first display provided for the communication terminal, the images including a first image generated from first image data at the communication terminal and a second image generated at the information processing device, and obtaining display area information indicating a size of a display area of the first display for displaying the second image,
    receiving user input of a change in size of the display area for displaying the second image to a new size, and update, in a memory, particular size information stored in association with an image data type of the second image to the new size,
    transmitting, to the information processing device, resolution information indicating a resolution calculated based on the new size,
    receiving, from the information processing device in response to execution of the program on the information processing device, second image data corresponding to an image being displayed on a display screen of the information processing device and having the calculated resolution; and
    controlling the first display to display the second image in the display area based on the second image data received from the information processing device.

12. A non-transitory recording medium storing a plurality of instructions which, when executed by processing circuitry of a communication terminal, causes the processing circuitry to perform a method, comprising:

transmitting a program, executable on an information processing device connectable to the communication terminal, to the information processing device, in response to a request from the information processing device, after the information processing device is connected to the communication terminal;

controlling display of images on a first display provided for the communication terminal, the images including a first image generated from first image data at the communication terminal and a second image generated at the information processing device, and obtaining display area information indicating a size of a display area of the first display for displaying the second image, receiving user input of a change in size of the display area for displaying the second image to a new size, and update, in a memory, particular size information stored in association with an image data type of the second image to the new size, transmitting, to the information processing device, resolution information indicating a resolution calculated based on the new size, receiving, from the information processing device in response to execution of the program on the information processing device, second image data corresponding to an image being displayed on a display screen of the information processing device and having the calculated resolution; and controlling the first display to display the second image in the display area based on the second image data received from the information processing device.

* * * * *